United States Patent
Fu et al.

(10) Patent No.: US 11,415,993 B2
(45) Date of Patent: Aug. 16, 2022

(54) METHOD AND APPARATUS FOR PROCESSING DRIVING REFERENCE LINE, AND VEHICLE

(71) Applicant: Baidu Online Network Technology (Beijing) Co., Ltd., Beijing (CN)

(72) Inventors: Xiaoxin Fu, Beijing (CN); Dayang Hao, Beijing (CN); Zhenguang Zhu, Beijing (CN); Zhiyuan Chen, Beijing (CN); Yuchang Pan, Beijing (CN); Fan Zhu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 210 days.

(21) Appl. No.: 16/790,333

(22) Filed: Feb. 13, 2020

(65) Prior Publication Data
US 2020/0272156 A1   Aug. 27, 2020

(30) Foreign Application Priority Data
Feb. 22, 2019 (CN) .......................... 201910140451.8

(51) Int. Cl.
G05D 1/02 (2020.01)
B60W 30/09 (2012.01)

(52) U.S. Cl.
CPC .......... G05D 1/0214 (2013.01); B60W 30/09 (2013.01); B60W 2554/80 (2020.02); G05D 2201/0212 (2013.01)

(58) Field of Classification Search
CPC ........ G05D 1/0214; G05D 2201/0212; B60W 30/09; B60W 2554/80; B60W 30/12;
(Continued)

(56) References Cited

U.S. PATENT DOCUMENTS

| | | | |
|---|---|---|---|
| 5,448,479 A | 9/1995 | Kemner et al. | |
| 2015/0032288 A1* | 1/2015 | Huth | G08G 1/165 701/1 |

(Continued)

FOREIGN PATENT DOCUMENTS

| | | |
|---|---|---|
| CN | 103377583 A | 10/2013 |
| CN | 106030609 A | 10/2016 |

(Continued)

OTHER PUBLICATIONS

First Office Action issued by the Chinese National Intellectual Property Administration Chinese application No. 2019101404518 dated Jul. 16, 2021 (10 pages).

(Continued)

*Primary Examiner* — Nadeem Odeh
(74) *Attorney, Agent, or Firm* — Benesch, Friedlander, Coplan & Aronoff LLP

(57) ABSTRACT

A method and apparatus for processing a driving reference line, and a vehicle are provided. The method comprises: acquiring position information of at least one obstacle in a range covered by an original driving reference line; determining a safety range parameter based on the position information of the at least one obstacle; adjusting a coefficient of a polynomial curve corresponding to the original driving reference line based on the safety range parameter, to obtain an adjusted polynomial curve; and determining an adjusted driving reference line based on the updated polynomial curve. The safety problem of the driving reference line caused by the insufficient obstacle avoidance ability of the driving reference line is solved.

12 Claims, 5 Drawing Sheets

(58) Field of Classification Search
CPC ....... B60W 30/18163; B60W 2552/05; B60W 2554/402; B60W 30/08; B60W 30/18072; B60W 40/02; B60W 60/0015; B60W 2552/50; B60Y 2300/18066
USPC .................................................. 701/26, 301
See application file for complete search history.

(56) References Cited

U.S. PATENT DOCUMENTS

| | | | |
|---|---|---|---|
| 2015/0151725 | A1 | 6/2015 | Clarke |
| 2016/0280265 | A1* | 9/2016 | Hass ................. B62D 15/0265 |
| 2017/0123413 | A1 | 5/2017 | Ye et al. |
| 2017/0183004 | A1 | 6/2017 | Bonarens |
| 2017/0186322 | A1* | 6/2017 | Bonarens ............. B60W 30/12 |
| 2018/0165966 | A1* | 6/2018 | Ishikawa .............. B60W 50/14 |

FOREIGN PATENT DOCUMENTS

| | | | |
|---|---|---|---|
| CN | 106094812 | A | 11/2016 |
| CN | 106856502 | A | 6/2017 |
| CN | 107221182 | A | 9/2017 |
| CN | 206551981 | U | 10/2017 |
| CN | 107329482 | A | 11/2017 |
| CN | 107748563 | A | 3/2018 |
| CN | 107764255 | A | 3/2018 |
| CN | 107830869 | A | 3/2018 |
| CN | 107843267 | A | 3/2018 |
| CN | 107894237 | A | 4/2018 |
| CN | 107933560 | A | 4/2018 |
| CN | 108334086 | A | 7/2018 |
| CN | 108460494 | A | 8/2018 |
| CN | 108646735 | A | 10/2018 |
| CN | 108898866 | A | 11/2018 |
| CN | 109085820 | A | 12/2018 |
| CN | 109263639 | A | 1/2019 |
| CN | 109324609 | A | 2/2019 |
| CN | 109813328 | A | 5/2019 |
| EP | 2752719 | A1 | 7/2014 |
| EP | 3244381 | A1 | 11/2017 |
| JP | 2010018074 | A | 1/2010 |
| JP | 2010501413 | A | 1/2010 |
| JP | 2016122308 | A | 7/2016 |
| JP | 2016-203882 | A | 12/2016 |
| JP | 2017013518 | A | 1/2017 |
| JP | 2018138404 | A | 9/2018 |
| KR | 10-2012-0054879 | A | 5/2012 |
| KR | 101421172 | B1 | 7/2014 |
| WO | 9821631 | A1 | 5/1998 |
| WO | 0010062 | A2 | 2/2000 |
| WO | 2014148980 | A1 | 9/2014 |
| WO | 2017014012 | A1 | 1/2017 |

OTHER PUBLICATIONS

Search Report issued by the Chinese National Intellectual Property Administration Chinese application No. 2019101404518 dated Jul. 9, 2021 (5 pages).
Extended European Search Report in European Patent Application No. 20158980.1, dated Jun. 29, 2020 (9 pages).
Werling, M. et al., "Optimal Trajectory Generation for Dynamic Street Scenarios in a Frenét Frame," IEEE International Conference on Robotics and Automation: ICRA 2010, May 3, 2020, XP031743734, ISBN: 978-1-4244-5038-1, pp. 987-993 (7 pages).
Dongchan, K. et al., "Local Trajectory Planning and Control for Autonomous Vehicles Using the Adaptive Ptential Field," 2017 IEEE Conference on Control Technology and Applications (CCTA), IEEE, Aug. 27, 2017, XP033162630, DOI: 10.1109/CCTA.2017. 8062588, pp. 987-993 (7 pages).
Notice of Reasons for Refusal issued by the Japanese Patent Office in Japanese application No. 2020-027727, dated Apr. 28, 2021 (9 pages).
First Office Action issued by The State Intellectual Property Office of People's Republic of China in Chinese application No. 201910122817.9, dated Jun. 30, 2021 (13 pages).
Search Report issued by The China National Intellectual Property Administration in Chinese Application No. 201910122817.9, dated Jun. 21, 2021 (7 pages).
Notification of the Reason for Refusal issued by the Korean Patent Office in Korean Application No. 10-2020-0020893, dated Apr. 9, 2021 (13 pages).
Office Action and Search Report issued in Chinese patent application No. 2019101404518, dated Mar. 25, 2022.
Luo, X., "Improvement of intelligent vehicle driving control technology based on vision", China Computer& Communication, Feb. 28, 2021.
Delfin, J., et al., "Humanoid navigation using a visual memory with obstacle avoidance", Robotics and Autonomous Systems 109, pp. 109-124, Dec. 31, 2018.
Guo, P., "Local Path Planning of Driverless Cars Based on Cost Function", China J. Highw. Transp., Jun. 3, 2019.

* cited by examiner

METHOD AND APPARATUS FOR PROCESSING DRIVING REFERENCE LINE, AND VEHICLE

CROSS-REFERENCE TO RELATED APPLICATION

This application claims priority to Chinese Patent Application No. 201910140451.8, filed on Feb. 22, 2019, which is hereby incorporated by reference in its entirety.

TECHNICAL FIELD

The technical field relates to unmanned driving control technologies, and particularly to a method and apparatus for processing a driving reference line method, and a vehicle.

BACKGROUND

The driving reference line is a basis for planning an unmanned vehicle trajectory. The traditional methods generate a driving reference line map offline based on a high precision map, then load it in a travelling process of an unmanned vehicle, and extract a corresponding driving reference line for planning a trajectory. However, the traditional methods may merely refer to the traffic ability at a lane level when generating the driving reference line, while cannot guarantee the safety of the driving reference line.

SUMMARY

A method and apparatus for processing a driving reference line, and a vehicle are provide according to embodiments of the present disclosure, so as to at least solve the safety problem of the driving reference line caused by the insufficient obstacle avoidance ability of the driving reference line.

In a first aspect, a method for processing a driving reference line is provided according to an embodiment of the present disclosure, and the method includes:

acquiring position information of at least one obstacle in a range covered by an original driving reference line;

determining a safety range parameter based on the position information of the at least one obstacle;

adjusting a coefficient of a polynomial curve corresponding to the original driving reference line based on the safety range parameter, to obtain an adjusted polynomial curve; and determining an adjusted driving reference line based on the adjusted polynomial curve.

In one embodiment, the method further includes: acquiring at least one parameter of a target vehicle, wherein the determining a safety range parameter based on the position information of the at least one obstacle includes: determining a safety range parameter of at least one position based on the at least one parameter of the target vehicle and the position information of the at least one obstacle.

In one embodiment, the method further includes:

adjusting the safety range parameter of the at least one position based on a type of at least one lane included in the driving reference line, to obtain an adjusted safety range parameter.

In one embodiment, the adjusting a coefficient of a polynomial curve corresponding to the original driving reference line based on the safety range parameter, to obtain an updated polynomial curve includes:

adjusting the coefficient of the polynomial curve corresponding to the original driving reference line based on the safety parameter range and a loss function, to obtain the adjusted polynomial curve that avoids the at least one obstacle and has a lowest route cost.

In one embodiment, the original driving reference line includes centerlines corresponding to at least two lanes from a start point to an end point, and wherein the method further includes: continuing using the original driving reference line, when the coefficient of the polynomial curve corresponding to the original driving reference line fails to be adjusted based on the safety range parameter.

In a second aspect, an apparatus for processing a driving reference line is provide according to an embodiment of the present disclosure, and the apparatus includes:

an information acquisition unit configured to acquire position information of at least one obstacle in a range covered by an original driving reference line;

a parameter processing unit configured to determine a safety range parameter based on the position information of the at least one obstacle; and an adjustment unit configured to adjust a coefficient of a polynomial curve corresponding to the original driving reference line based on the safety range parameter, to obtain an adjusted polynomial curve; and determine an updated driving reference line based on the adjusted polynomial curve.

In one embodiment, the information acquisition unit is further configured to acquire at least one parameter of a target vehicle; and the parameter processing unit is further configured to determine a safety range parameter of at least one position based on the at least one parameter of the target vehicle and the position information of the at least one obstacle.

In one embodiment, the parameter processing unit is further configured to adjust the safety range parameter of the at least one position based on a type of at least one lane included in the driving reference line, to obtain an adjusted safety range parameter.

In one embodiment, the adjustment unit is further configured to adjust the coefficient of the polynomial curve corresponding to the original driving reference line based on the safety parameter range and a loss function, to obtain the adjusted polynomial curve that avoids the at least one obstacle and has a lowest route cost.

In one embodiment, the original driving reference line includes centerlines corresponding to at least two lanes from a start point to an end point, and wherein the adjustment unit is further configured to continue using the original driving reference line, when the coefficient of the polynomial curve corresponding to the original driving reference line fails to be adjusted based on the safety range parameter.

In a third aspect, a vehicle is provided according to an embodiment of the present disclosure, and the functions thereof can be realized by hardware or by executing corresponding software through the hardware. The hardware or the software includes one or more modules corresponding to the above functions.

In a possible implementation, the vehicle structurally includes: a memory configured to store a program supporting the apparatus to execute the above method, and a processor configured to execute the program stored in the memory. The apparatus may further include a communication interface configured to communicate with another device or a communication network.

In a fourth aspect, a computer readable storage medium is provided according to an embodiment of the present disclosure, the storage medium storing a computer program, which implements the method according to any one of the above embodiments when being executed by a processor.

One of the above technical solutions has the following advantages or beneficial effects: the position information of the obstacle in the lane where the original driving reference line is located can be obtained, the safe distance can be determined based on the position information of the obstacle, and then the original driving reference line can be adjusted. In this way, the safety of the adjusted driving reference line can be ensured, thereby further ensuring the obstacle avoidance ability and safe travel performances of the unmanned vehicle with the driving reference line.

The above summary is for the purpose of description only, and is not intended to be limiting in any way. In addition to the illustrative aspects, embodiments and features described above, further aspects, embodiments and features of the present disclosure will be readily apparent with reference to the drawings and the following detailed descriptions.

BRIEF DESCRIPTION OF THE DRAWINGS

In the drawings, unless otherwise specified, the same reference numeral refers to the same or similar parts or elements throughout the drawings. These drawings are not necessarily drawn to scale. It should be understood that these drawings depict only some embodiments disclosed in accordance with the present disclosure and should not be considered as limitations to the scope of the present disclosure.

DETAILED DESCRIPTION OF THE EMBODIMENTS

In the following, certain embodiments are briefly described. As will be recognized by persons skilled in the art, the described embodiments can be modified in a variety of different ways without departing from the spirit or scope of the present disclosure. Accordingly, the drawings and descriptions are regarded as illustrative in nature rather than restrictive.

Figure 1:
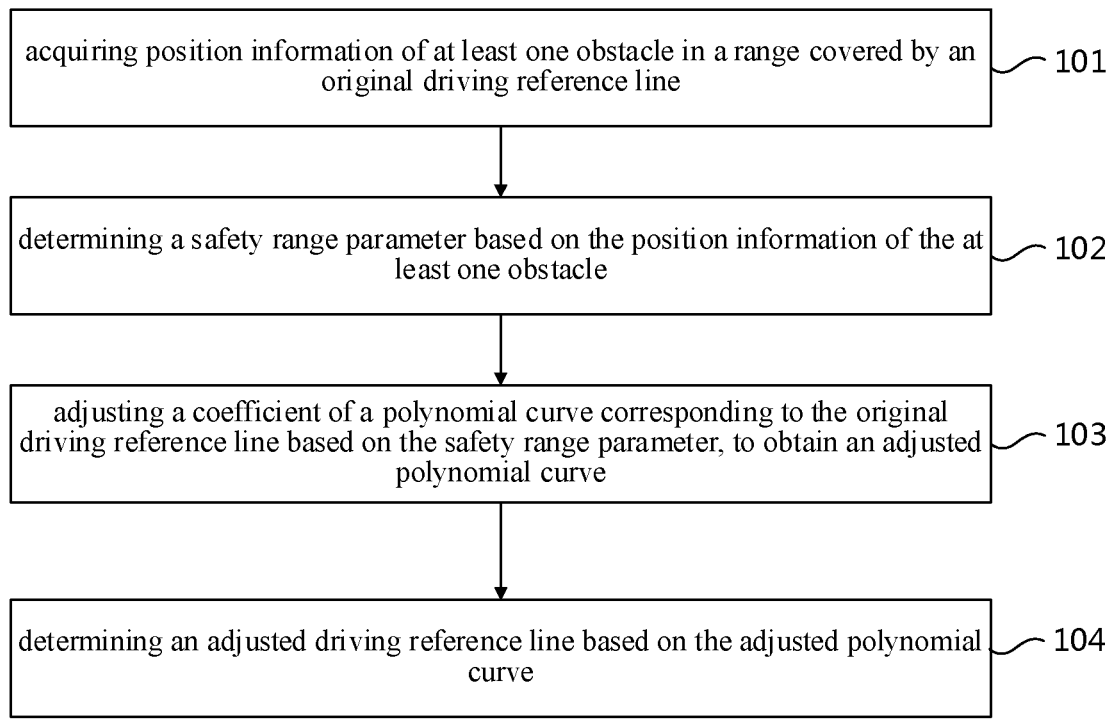
FIG. 1 illustrates a first flowchart of a method for processing a driving reference line according to an embodiment of the present disclosure.

A method for processing a driving reference line is provided according to an embodiment of the present disclosure. In one embodiment, as illustrated in FIG. 1, there is provided a method for processing a driving reference line, including:

S101: acquiring position information of at least one obstacle in a range covered by an original driving reference line;

S102: determining a safety range parameter based on the position information of the at least one obstacle;

S103: adjusting a coefficient of a polynomial curve corresponding to the original driving reference line based on the safety range parameter, to obtain an adjusted polynomial curve; and S104: determining an adjusted driving reference line based on the adjusted polynomial curve.

In this embodiment, there is proposed a processing solution of generating a driving reference line smoothly online and generating a smooth curve by a secondary planning method, so as to ensure that the unmanned vehicle is provided with a sufficient obstacle avoidance ability.

In S101, the acquired position information of the at least one obstacle may be two-dimensional coordinate information of the obstacle, and the corresponding coordinate system thereof may be the same as a coordinate system corresponding to a high precision map. In processing, the position information of the obstacle needs to be combined with the high precision map.

In addition, the obstacle in this embodiment may be understood as a static obstacle, such as a road shoulder, a fence, etc. The position information of the obstacle may be information collected by a server during generating or updating a high precision map, so the position information of the at least one obstacle may be acquired directly through the high precision map. Of course, the obstacle may also be an obstacle that is static for a period of time. For example, if a lane in a certain section of road needs to be repaired at present, an obstacle such as a fence may be disposed for a period of time. In this case, the server may notify the vehicle by updating the high precision map, so that the vehicle can set the fence as an obstacle for subsequent processing. The server may acquire the position information of such obstacle that is static for a period of time by a roadside acquisition unit or a camera, etc., which will not be described here.

Figure 2:
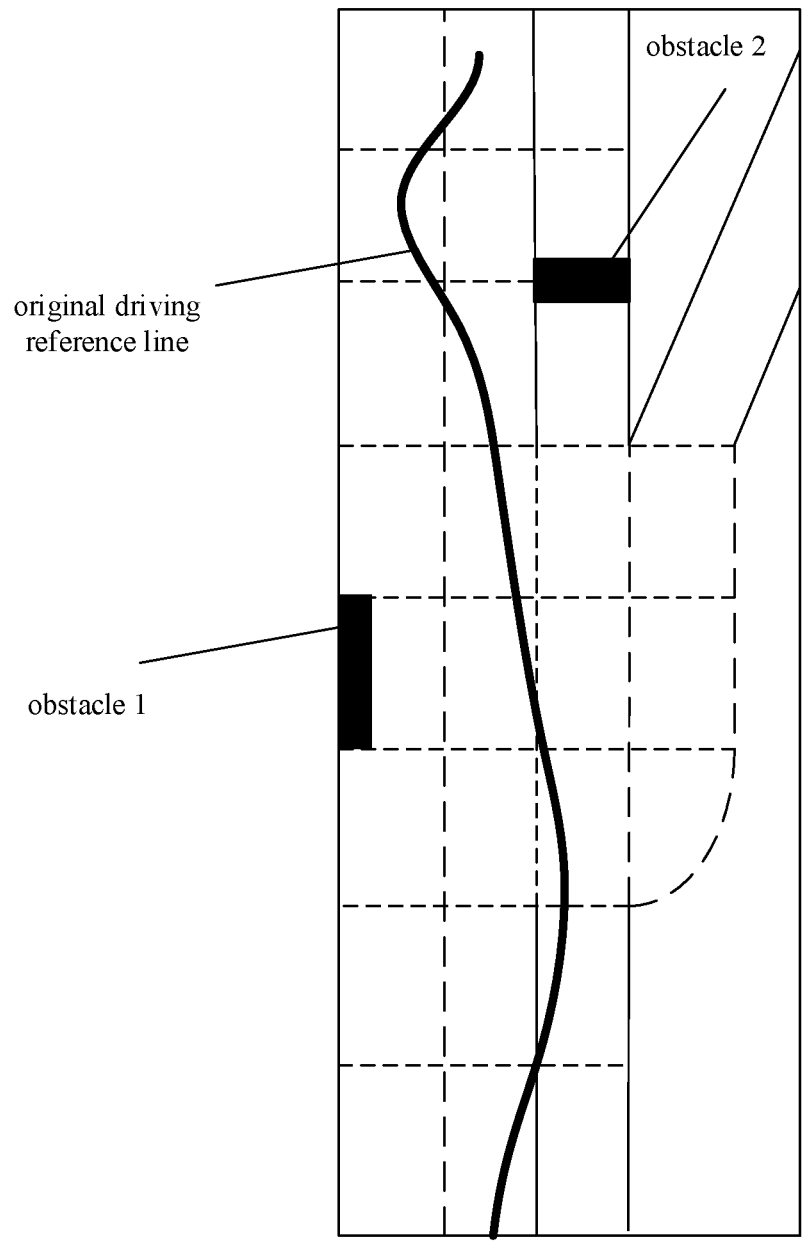
FIG. 2 illustrates a schematic diagram of a scene where there is an obstacle in a lane where an original driving reference line is located according to an embodiment of the present disclosure.

For example, referring to FIG. 2, obstacles 1 and 2 are illustrated, wherein the obstacle 1 may be understood as a road shoulder, and the obstacle 2 may be a fence on a road, so it is necessary to acquire position information of the obstacles 1 and 2 in advance.

Before performing S102, the method further includes acquiring at least one parameter of a target vehicle.

In S102, the determining a safety range parameter based on the position information of the at least one obstacle includes: determining a safety range parameter of at least one position based on the at least one parameter of the target vehicle and the position information of the at least one obstacle.

The vehicle parameter may be a dimension parameter of a vehicle, including a length, a width or the like of the vehicle, in some scenes, possibly including a height, a wheelbase, etc. of the vehicle, which is not exhaustive here. The vehicle parameter may be acquired directly according to a model, a brand or other information of the target vehicle set in the high precision map. In other words, it can be understood that the server may acquire the parameters corresponding to the brands and models of various vehicles in advance, including, but not limited to, the above dimension parameters, as well as a fuel consumption, acceleration information, etc., which are not described here since being not cared in this embodiment.

Figure 3:
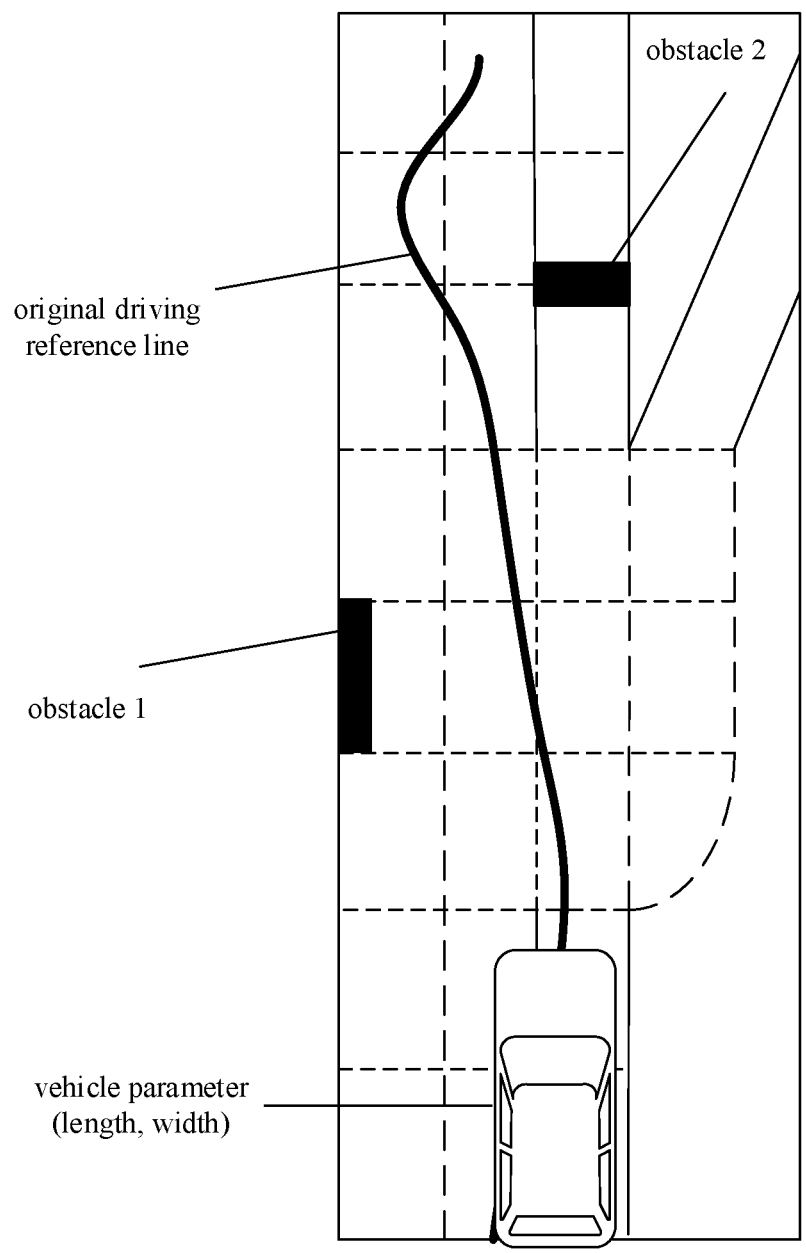
FIG. 3 illustrates a schematic diagram of a scene of combining a target vehicle and an obstacle according to an embodiment of the present disclosure.

Referring to FIG. 3, a target vehicle may be provided, and parameters of the target vehicle, such as a height and a length, may be displayed or not displayed.

Determining a safety range parameter of at least one position based on at least one parameter of the target vehicle and the position information of the at least one obstacle may be: determining a safety range parameter required when the target vehicle safely passes through an area corresponding to a certain obstacle by combining an edge position of the obstacle and at least one of a length and a width of the target vehicle.

In addition, the corresponding safety range parameters at different positions may be the same or different; if they are the same, the safety parameter range may be a fixed value, and if they are different, the corresponding safety parameter range should be determined according to a current position of the vehicle.

In S103, the adjusting a coefficient of a polynomial curve corresponding to the original driving reference line based on the safety range parameter, to obtain an adjusted polynomial curve includes:

adjusting the coefficient of the polynomial curve corresponding to the original driving reference line based on the safety parameter range and a loss function, to obtain the adjusted polynomial curve that avoids the at least one obstacle and has a lowest route cost.

Specifically, a secondary planning manner may be adopted: firstly, a driving reference line $C(x, y)$ is expressed, on a two-dimensional plane, as a polynomial curve $x=f(p, t)$ and $y=g(q, t)$, wherein $f(\ )$ and $g(\ )$ are polynomial functions, p and q are corresponding polynomial coefficients, and t is an independent variable. By considering the vehicle parameters (length, width, etc.) and combining the actual road conditions, a smooth parameter (e.g., a safe distance from a road shoulder or a fence) may be freely set, and mathematically modeled into an inequality constraint of a secondary plan, for example, $h(p, q, w) < l_0$ indicates that a projection distance of a point w (e.g., a certain position on the road shoulder or an edge of the obstacle) projected onto a manually marked reference line must be limited within a safe range $l_0$.

Then the loss function $J(p, q)$ is used to express a weighted sum of polynomial derivative integrals of different orders, and the online smoothing of the driving reference line is completed by minimizing $J(p, q)$ to solve the secondary planning problem.

It can be seen that by adopting the above solution, the position information of the obstacle in the lane where the original driving reference line is located can be obtained, the safe distance can be determined based on the position information of the obstacle, and then the original driving reference line can be adjusted. In this way, the safety of the adjusted driving reference line can be ensured, thereby further ensuring the obstacle avoidance ability and safety when the unmanned vehicle is travelling with the driving reference line. In addition, the safety distance is adjusted by further combining the vehicle parameter and the position information of the obstacle, so as to ensure that the vehicle parameter can also be considered in the obstacle avoidance processing, thereby further improving the safety of the driving reference line.

Figure 4:
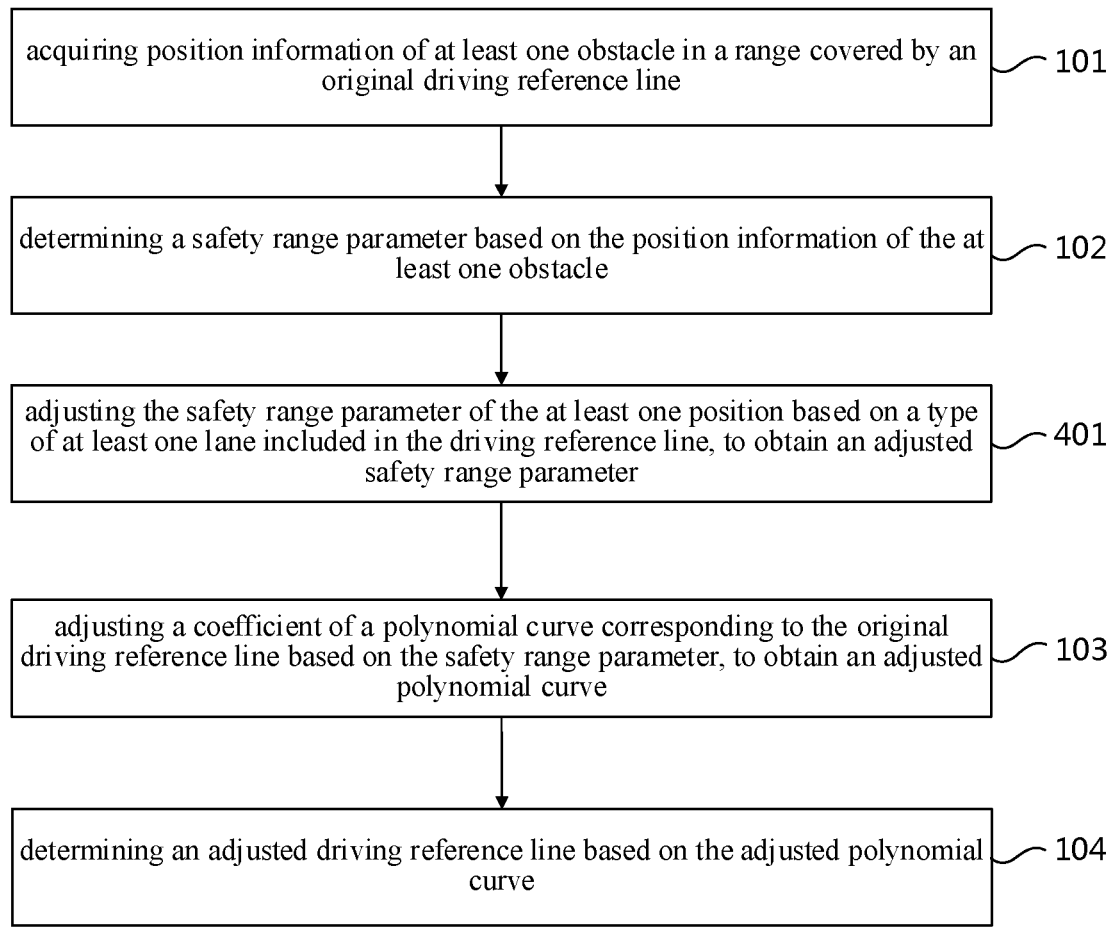
FIG. 4 illustrates a second flowchart of a method for processing a driving reference line according to an embodiment of the present disclosure.

Based on FIG. 1 and in conjunction with FIG. 4, in one embodiment, after performing S102, the method may further include:

S401: adjusting the safety range parameter of the at least one position based on a type of at least one lane included in the driving reference line, to obtain an adjusted safety range parameter.

S101 and S102 in this embodiment are the same as those in the previous embodiment, and will not be repeated here.

The type of the lane may include: a type of a lane line and a lane passage type; the lane line may include a dashed line, a solid line, etc., and the lane passage type may be an intersection, etc.

In addition to obtaining the safety range parameter based on S102, this embodiment can also adjust the safety range parameter according to the type of the lane, that is, by adopting the above processing manner of secondary planning, the magnitude of the safety range $l_0$ of the inequality constraint can be adjusted according to the lane conditions (e.g., the type of the lane, whether the lane is in front of an intersection, the type of the lane line, etc.).

During adjustment, different safety range parameters may be adjusted according to corresponding lane types, for example, a large distance is required during turning at the position of the intersection, to reduce the risk of rubbing, or when the lane line is a dashed line, the distance from the lane line may be set as not being too large, such as 0.5 m, while when the lane line is a solid line, the safety range parameter may be set to be large, that is, the safety distance is large to avoid pressing the solid line, and the safety distance may be set to be not less than 0.8 m at this time. Of course, those described above are just examples, and different safety parameter ranges may be determined based on different situations in the actual processing, which will not be exhaustive in this embodiment.

The original driving reference line includes centerlines corresponding to at least two lanes from a start point to an end point.

The method further includes: continuing using the original driving reference line, when the coefficient of the polynomial curve corresponding to the original driving reference line fails to be adjusted based on the safety range parameter.

Further, in order to improve the robustness of the algorithm, if the processing in S103 fails, an original unsmoothed lane centerline may be taken as the driving reference line. It may be appreciated that the original driving reference line is a centerline. If the processing in S103 fails, the original driving reference line is still used for the driving control.

Of course, there may also be another manner, that is, when the original driving reference line is not a centerline but a smooth curve processed artificially or in other ways, it may be appreciated that the original driving reference line is taken for the driving control of the target vehicle, and it is unnecessary to select the centerline of the lane as the driving reference line again.

It can be seen that by adopting the above solution, the position information of the obstacle in the lane where the original driving reference line is located can be obtained, the safe distance can be determined based on the position information of the obstacle, and then the original driving reference line can be adjusted. In this way, the safety of the adjusted driving reference line can be ensured, thereby further ensuring the obstacle avoidance ability and safety when the unmanned vehicle is travelling with the driving reference line. In addition, the safety distance is adjusted by further combining the vehicle parameter and the position information of the obstacle, so as to ensure that the vehicle parameter can also be considered in the obstacle avoidance processing, thereby further improving the safety of the driving reference line.

Figure 5:
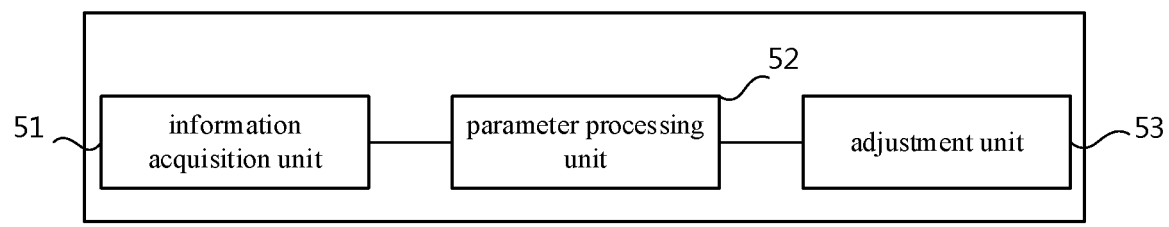
FIG. 5 illustrates a structural schematic diagram of an apparatus for processing a driving reference line according to an embodiment of the present disclosure.

An apparatus for processing a driving reference line is provided according to an embodiment, as illustrated in FIG. 5, the apparatus includes:

an information acquisition unit 51 configured to acquire position information of at least one obstacle in a range covered by an original driving reference line;

a parameter processing unit 52 configured to determine a safety range parameter based on the position information of the at least one obstacle; and an adjustment unit 53 configured to adjust a coefficient of a polynomial curve corresponding to the original driving reference line based on the safety range parameter, to obtain an adjusted polynomial curve; and determine an adjusted driving reference line based on the adjusted polynomial curve.

The information acquisition unit 51 is further configured to acquire at least one parameter of a target vehicle.

The parameter processing unit 52 is further configured to determine a safety range parameter of at least one position based on the at least one parameter of the target vehicle and the position information of the at least one obstacle.

The parameter processing unit 52 is further configured to adjust the safety range parameter of the at least one position based on a type of at least one lane included in the driving reference line, to obtain an adjusted safety range parameter.

The adjustment unit 53 is further configured to adjust the coefficient of the polynomial curve corresponding to the original driving reference line based on the safety parameter range and a loss function, to obtain the adjusted polynomial curve that avoids the at least one obstacle and has a lowest route cost.

The original driving reference line includes centerlines corresponding to at least two lanes from a start point to an end point.

The adjustment unit 53 is further configured to continue using the original driving reference line, when the coefficient of the polynomial curve corresponding to the original driving reference line fails to be adjusted based on the safety range parameter.

The functions of the modules in the apparatus according to the embodiment of the present disclosure can refer to corresponding descriptions in the above method, and will not be repeated here.

It can be seen that by adopting the above solution, the position information of the obstacle in the lane where the original driving reference line is located can be obtained, the safe distance can be determined based on the position information of the obstacle, and then the original driving reference line can be adjusted. In this way, the safety of the adjusted driving reference line can be ensured, thereby further ensuring the obstacle avoidance ability and safety when the unmanned vehicle is travelling with the driving reference line. In addition, the safety distance is adjusted by further combining the vehicle parameter and the position information of the obstacle, so as to ensure that the vehicle parameter can also be considered in the obstacle avoidance processing, thereby further improving the safety of the driving reference line.

Figure 6:
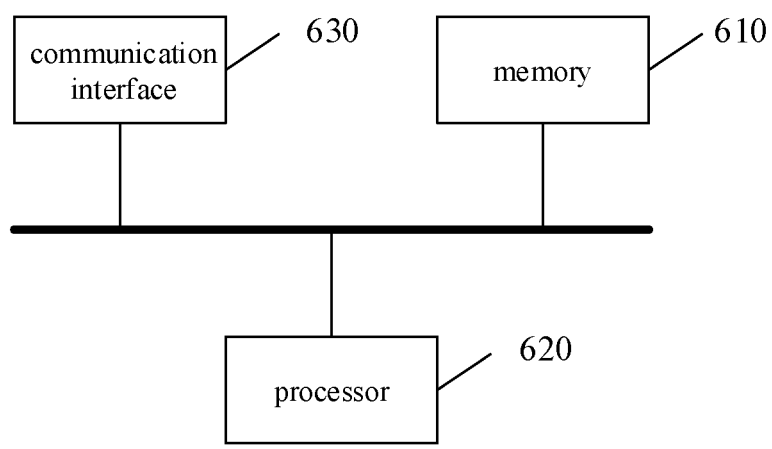
FIG. 6 illustrates a structural block diagram of a vehicle according to an embodiment of the present disclosure.

FIG. 6 illustrates a structural block diagram of a vehicle according to an embodiment of the present disclosure. As illustrated in FIG. 6, the vehicle includes: a memory 610 and a processor 620, wherein a computer program executable on the processor 620 is stored in the memory 610. When the processor 620 executes the computer program, the method in the above embodiment is implemented. There may be one or more memories 610 and one or more processors 620.

The vehicle further includes:

a communication interface 630 configured to communicate with an external device for a data interactive transmission.

The memory 610 may include a high-speed random access memory (RAM), and may also include a non-volatile memory, such as at least one disk memory.

If being implemented independently, the memory 610, the processor 620 and the communication interface 630 may be connected to each other through a bus and perform communications with each other. The bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, etc. For the convenience of representation, a single thick line is used in FIG. 8, but it does not mean that there is a single bus or one type of bus.

Alternatively, during implementation, if being integrated onto one chip, the memory 610, the processor 620 and the communication interface 630 can perform communications with each other through internal interfaces.

A computer readable storage medium is provided according to an embodiment of the present disclosure, the storage medium storing a computer program, which implements the method according to any one of the above embodiments when being executed by a processor.

Among the descriptions herein, a description referring to terms 'one embodiment', 'some embodiments', 'example', 'specific example', 'some examples', or the like means that specific features, structures, materials, or characteristics described in conjunction with the embodiment(s) or example(s) are included in at least one embodiment or example of the present disclosure. Moreover, the specific features, structures, materials, or characteristics described may be incorporated in any one or more embodiments or examples in a suitable manner. In addition, persons skilled in the art may incorporate and combine different embodiments or examples described herein and the features thereof without a contradiction therebetween.

In addition, the terms 'first' and 'second' are used for descriptive purposes only and cannot be understood as indicating or implying a relative importance or implicitly pointing out the number of the technical features indicated. Thus, the features defined with 'first' and 'second' may explicitly or implicitly include at least one of the features. In the description of the present disclosure, 'a (the) plurality of' means 'two or more', unless otherwise specified explicitly.

Any process or method description in the flowchart or otherwise described herein may be understood to mean a module, a segment, or a part including codes of executable instructions of one or more steps for implementing a specific logical function or process, and the scope of preferred embodiments of the present disclosure includes additional implementations, wherein the functions may be performed without in a sequence illustrated or discussed, including being performed in a substantially simultaneous manner according to the functions involved or in a reverse sequence, which should be understood by skilled persons in the technical field to which the embodiments of the present disclosure belong.

At least one of the logics and the steps represented in the flowchart or otherwise described herein, for example, may be considered as a sequencing list of executable instructions for implementing logical functions, and may be embodied in any computer readable medium for being used by or in conjunction with an instruction execution system, an apparatus or a device (e.g., a computer-based system, a system including a processor, or any other system capable of fetching and executing instructions from the instruction execution system, the apparatus, or the device). Regarding this specification, the 'computer readable medium' may be any means that can contain, store, communicate, propagate, or transfer a program for being used by or in conjunction with the instruction execution system, the apparatus, or the device. More specific examples (non-exhaustive list) of the computer readable medium include an electrical connection portion (electronic device) having one or more wires, a portable computer enclosure (magnetic device), a random access memory (RAM), a read only memory (ROM), an erasable editable read only memory (EPROM or flash memory), an optical fiber device, and a portable read only memory (CDROM). In addition, the computer readable medium may even be paper or any other suitable medium on which the program is printed, because the program can be electronically obtained, for example, by optically scanning the paper or other medium, and editing, interpreting, or processing in other suitable ways if necessary, and then stored in a computer memory.

It should be understood that various parts of the present disclosure may be implemented by hardware, software, firmware, or combinations thereof. In the above embodiments, a plurality of steps or methods may be implemented by software or firmware stored in a memory and executed with a suitable instruction execution system. For example, if hardware is employed for implementation, like in another embodiment, the implementation may be made by any one or combinations of the following technologies known in the art: a discreet logic circuit having a logic gate circuit for implementing logic functions on data signals, an application specific integrated circuit having an appropriate combinational logic gate circuit, a programmable gate array (PGA), a field programmable gate array (FPGA), etc.

Persons of ordinary skill in the art can understand that all or part of the steps carried by the above method embodiments can be implemented by instructing relevant hardware through a program, wherein the program may be stored in a computer readable storage medium, and it includes one or combinations of the steps of the method embodiments when being executed.

In addition, the functional units in various embodiments of the present disclosure may be integrated into one processing module, or may be physically presented separately, or two or more units may be integrated into one module. The above integrated module may be implemented in the form of one of hardware and a software functional module. If the integrated module is implemented in the form of a software functional module and sold or used as an independent product, it may also be stored in a computer readable storage medium that may be a read only memory, a magnetic disk or an optical disk, etc.

Those described above are only embodiments of the present disclosure, but the protection scope of the present disclosure is not limited thereto. Within the technical scope revealed in the present disclosure, any skilled person familiar with the technical field can easily conceive of various changes or replacements thereof, which should be covered by the protection scope of the present disclosure. Therefore, the protection scope of the present disclosure should be subject to that of the accompanied claims.

The invention claimed is:

1. A method for processing a driving reference line, comprising:
   acquiring position information of at least one obstacle in a range covered by an original driving reference line;
   determining a safety range parameter of at least one position in an area corresponding to the at least one obstacle based on the position information of the at least one obstacle;
   adjusting the safety range parameter based on a type of at least one lane included in the original driving reference line, to obtain an adjusted safety range parameter;
   adjusting a coefficient of a polynomial curve corresponding to the original driving reference line based on the adjusted safety range parameter, to obtain an adjusted polynomial curve; and
   determining an adjusted driving reference line based on the adjusted polynomial curve.

2. The method according to claim 1, further comprising:
   acquiring at least one parameter of a target vehicle, wherein
   the determining the safety range parameter based on the position information of the at least one obstacle comprises: determining the safety range parameter of the at least one position in the area corresponding to the at least one obstacle based on the at least one parameter of the target vehicle and the position information of the at least one obstacle.

3. The method according to claim 1, wherein the adjusting the coefficient of the polynomial curve corresponding to the original driving reference line based on the adjusted safety range parameter, to obtain the adjusted polynomial curve comprises:
   adjusting the coefficient of the polynomial curve corresponding to the original driving reference line based on the adjusted safety parameter range and a loss function, to obtain the adjusted polynomial curve that avoids the at least one obstacle and has a lowest route cost.

4. The method according to claim 1, wherein the original driving reference line comprises centerlines corresponding to at least two lanes from a start point to an end point, and
   wherein the method further comprises: continuing using the original driving reference line, when the coefficient of the polynomial curve corresponding to the original driving reference line fails to be adjusted based on the adjusted safety range parameter.

5. An apparatus for processing a driving reference line, comprising:
   one or more processors; and
   a storage device configured to store one or more programs, wherein
   the one or more programs, when executed by the one or more processors, cause the one or more processors to:
   acquire position information of at least one obstacle in a range covered by an original driving reference line;
   determine a safety range parameter of at least one position in an area corresponding to the at least one obstacle based on the position information of the at least one obstacle;
   adjust the safety range parameter based on a type of at least one lane included in the original driving reference line, to obtain an adjusted safety range parameter;
   adjust a coefficient of a polynomial curve corresponding to the original driving reference line based on the adjusted safety range parameter, to obtain an adjusted polynomial curve; and
   determine an adjusted driving reference line based on the adjusted polynomial curve.

6. The apparatus according to claim 5, wherein the one or more programs, when executed by the one or more processors, cause the one or more processors further to acquire at least one parameter of a target vehicle, and
wherein the one or more programs, when executed by the one or more processors, cause the one or more processors further to determine the safety range parameter of the at least one position in the area corresponding to the at least one obstacle based on the at least one parameter of the target vehicle and the position information of the at least one obstacle.

7. The apparatus according to claim 5, wherein the one or more programs, when executed by the one or more processors, cause the one or more processors further to adjust the coefficient of the polynomial curve corresponding to the original driving reference line based on the adjusted safety parameter range and a loss function, to obtain the adjusted polynomial curve that avoids the at least one obstacle and has a lowest route cost.

8. The apparatus according to claim 5, wherein the original driving reference line comprises centerlines corresponding to at least two lanes from a start point to an end point, and
wherein the one or more programs, when executed by the one or more processors, cause the one or more processors further to continue using the original driving reference line, when the coefficient of the polynomial curve corresponding to the original driving reference line fails to be adjusted based on the adjusted safety range parameter.

9. A non-transitory computer-readable storage medium comprising computer executable instructions stored thereon, wherein the executable instructions, when executed by a processor, causes the processor to:
acquire position information of at least one obstacle in a range covered by an original driving reference line;
determine a safety range parameter of at least one position in an area corresponding to the at least one obstacle based on the position information of the at least one obstacle;
adjust the safety range parameter based on a type of at least one lane included in the original driving reference line, to obtain an adjusted safety range parameter;
adjust a coefficient of a polynomial curve corresponding to the original driving reference line based on the adjusted safety range parameter, to obtain an adjusted polynomial curve; and
determine an adjusted driving reference line based on the adjusted polynomial curve.

10. The non-transitory computer-readable storage medium according to claim 9, wherein the executable instructions, when executed by the processor, causes the processor to acquire at least one parameter of a target vehicle, and
wherein the executable instructions, when executed by the processor, causes the processor further to determine the safety range parameter of the at least one position in the area corresponding to the at least one obstacle based on the at least one parameter of the target vehicle and the position information of the at least one obstacle.

11. The non-transitory computer-readable storage medium according to claim 9, wherein the executable instructions, when executed by the processor, causes the processor further to adjust the coefficient of the polynomial curve corresponding to the original driving reference line based on the adjusted safety parameter range and a loss function, to obtain the adjusted polynomial curve that avoids the at least one obstacle and has a lowest route cost.

12. The non-transitory computer-readable storage medium according to claim 9, wherein the original driving reference line comprises centerlines corresponding to at least two lanes from a start point to an end point, and
wherein the executable instructions, when executed by the processor, causes the processor further to continue using the original driving reference line, when the coefficient of the polynomial curve corresponding to the original driving reference line fails to be adjusted based on the adjusted safety range parameter.

* * * * *